United States Patent
Hartmann-Thompson et al.

(10) Patent No.: US 12,173,182 B2
(45) Date of Patent: Dec. 24, 2024

(54) METAL-POLYMER HYBRID MATERIALS WITH A HIGH REFRACTIVE INDEX

(71) Applicant: 3M INNOVATIVE PROPERTIES COMPANY, St. Paul, MN (US)

(72) Inventors: Claire Hartmann-Thompson, Lake Elmo, MN (US); Adam D. Miller, Vadnais Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 368 days.

(21) Appl. No.: 17/620,947

(22) PCT Filed: Jun. 23, 2020

(86) PCT No.: PCT/IB2020/055933
§ 371 (c)(1),
(2) Date: Dec. 20, 2021

(87) PCT Pub. No.: WO2020/261123
PCT Pub. Date: Dec. 30, 2020

(65) Prior Publication Data
US 2022/0298379 A1  Sep. 22, 2022

Related U.S. Application Data

(60) Provisional application No. 62/867,579, filed on Jun. 27, 2019.

(51) Int. Cl.
| | |
|---|---|
| *C09D 7/61* | (2018.01) |
| *C08G 77/26* | (2006.01) |
| *C08K 3/34* | (2006.01) |
| *C09D 183/08* | (2006.01) |
| *G02B 1/10* | (2015.01) |

(52) U.S. Cl.
CPC ........... *C09D 183/08* (2013.01); *C08G 77/26* (2013.01); *C08K 3/34* (2013.01); *C09D 7/61* (2018.01); *G02B 1/10* (2013.01); *C08K 2003/343* (2013.01)

(58) Field of Classification Search
None
See application file for complete search history.

(56) References Cited

U.S. PATENT DOCUMENTS

| | | | |
|---|---|---|---|
| 4,260,725 A | 4/1981 | Keogh | |
| 8,530,572 B2 | 9/2013 | Kolb | |
| 2010/0003501 A1 | 1/2010 | Liu | |
| 2014/0370307 A1 | 12/2014 | Hao | |
| 2015/0200091 A1* | 7/2015 | Chada | H01L 21/31133 438/694 |
| 2015/0349295 A1 | 12/2015 | Boesch | |
| 2018/0340119 A1 | 11/2018 | Piquette | |

FOREIGN PATENT DOCUMENTS

| | | |
|---|---|---|
| EP | 0494842 | 7/1992 |
| WO | 2018042302 | 3/2018 |
| WO | 2018122749 | 7/2018 |
| WO | 2019023096 | 1/2019 |

OTHER PUBLICATIONS

Bonchio, "Heterogeneous Photooxidation of Alcohols in Water by Photocatalytic Membranes Incorporating Decatungstate", Advanced Synthesis & Catalysis, 2003, vol. 345, No. 9-10, pp. 1119-1126.
Carraro, "Hybrid Materials Based on the Embedding of Organically Modified Transition Metal Oxoclusters or Polymetalates into Polymers for Functional Applications: A Review", Materials, May 2014, vol. 7, No. 5, pp. 3956-3989.
Graiver, "Polysiloxane Zwitterionomers and Related Model Compounds. I. Synthesis", Journal of Polymer Science Part A: Polymer Chemistry, Nov. 1979, vol. 17, No. 11, pp. 3559-3572.
International Search Report for PCT International Application No. PCT/IB2020/055933, mailed on Sep. 15, 2020, 5 pages.
Jintokua, "The simplest method for fabrication of high refractive index polymer-metal oxide hybrids based on a soap-free process", Chemical Communications, Jul. 2014, vol. 50, No. 73, pp. 10611-10614.
Koliadima, "Monodispersed Colloidal Salts of Tungstosilicic Acid", Langmuir, Jul. 1997, vol. 13, No. 14, pp. 3733-3736.
Lebeau, "Hybrid materials for optics and photonics", Chemical Society Reviews, Feb. 2011, vol. 40, No. 2, pp. 886-906.
Matsumoto, "Facile preparation of high refractive index polymer films composited with a tungstophosphoric acid" Materials Letters, 2017, vol. 190, pp. 236-239.
Proust, "Functionalization and post-functionalization: a step towards polyoxometalate-based materials", Oct. 2012, vol. 41, No. 22, pp. 7605-7622.
Qi, "Polyoxometalate/polymer hybrid materials: fabrication and properties", Polymer International, Nov. 2009, vol. 58, No. 11, pp. 1217-1225.
Silicon Compounds: Silanes and Silicones Handbook, Gelest Inc, Table of Contents (2013) 3 Pages.

* cited by examiner

*Primary Examiner* — Sheeba Ahmed
(74) *Attorney, Agent, or Firm* — Jeffrey M. Olofson (57) ABSTRACT

Coatable metal-polymer hybrid compositions include a polyoxometalate and a siloxane-based polyamine. The coatable composition, upon coating forms a layer, that is optically transparent and has a refractive index of at least 1.42. The polyoxometalate and the amino groups of the siloxane-based polyamine form crosslinks via an acid-base interaction. The layer may also include a fluid.

14 Claims, 1 Drawing Sheet

METAL-POLYMER HYBRID MATERIALS WITH A HIGH REFRACTIVE INDEX

FIELD OF THE DISCLOSURE

Disclosed herein are metal-polymer hybrid materials that have a relatively high refractive index and coatable compositions that contain the metal-polymer hybrid materials.

BACKGROUND

Increasingly, optical devices are becoming more complicated and involve more and more functional layers. As light travels through the layers of the optical device, the light can be altered by the layers in a wide variety of ways. For example, light can be reflected, refracted or absorbed. In many cases, layers that are included in optical devices for non-optical reasons adversely affect the optical properties. For example, if a support layer is included that is not optically clear, the absorption of light by the non-optically support layer can adversely affect the light transmission of the entire device.

One common difficulty with multi-layer optical devices is that when layers of differing refractive indices are adjacent to each other, refraction of light can occur at their interface. In some devices this refraction of light is desirable, but in other devices the refraction is undesirable. In order to minimize or eliminate this refraction of light at the interface between two layers, efforts have been made to minimize the difference in refractive index between the two layers that form the interface. However, as a wider range of materials are employed within optical devices, the matching of refractive indices can become increasingly difficult. Organic polymer films and coatings, which are frequently used in optical devices, have a limited range of refractive indices. As higher refractive index materials are increasingly used in optical devices, it has become increasingly difficult to prepare organic polymeric compositions which have suitable refractive indices and yet retain the desirable features of organic polymers, features such as ease of processing, flexibility, and the like.

SUMMARY

Disclosed herein are metal-polymer hybrid materials that have a relatively high refractive index, coatable compositions that contain the metal-polymer hybrid materials, and articles that can be prepared with the metal-polymer hybrid materials.

In some embodiments, the metal-polymer hybrid composition comprises a polyoxometalate, and a siloxane-based polyamine, where the composition is a coatable composition that upon coating forms a layer, where the layer is optically transparent and has a refractive index of at least 1.42. The polyoxometalate and the amino groups of the siloxane-based polyamine form crosslinks via an acid-base interaction. In some embodiments, the composition further comprises a fluid.

In other embodiments, the metal-polymer hybrid composition comprises a polyoxometalate, and a siloxane-based monoamine. The composition is a coatable composition that upon coating forms a layer, where the layer is optically transparent and has a refractive index of at least 1.42. The polyoxometalate and the amino groups of the siloxane-based monoamine form an acid-base interaction.

Also disclosed are articles. In some embodiments, the articles comprise a substrate with a first major surface and a second major surface, a metal-polymer hybrid layer adjacent to at least a portion of the second major surface of the substrate, and an inorganic barrier layer in contact with the metal-polymer hybrid layer. The metal-polymer hybrid layer comprises a layer prepared from a coatable composition, wherein the coatable composition comprises a polyoxometalate, and at least one siloxane-based polyamine. In some embodiments, the coatable composition further comprises a solvent, a fluid, or a combination thereof. The layer has a thickness of from 50 nanometers-16 micrometers, is optically transparent, and has a refractive index of at least 1.42.

Also disclosed are methods of preparing articles. In some embodiments, the method comprises providing a substrate with a first major surface and a second major surface, providing a coatable composition, disposing the coatable composition on at least a portion of the second major surface of the substrate to form a layer; where the layer has a thickness of from 50 nanometers-16 micrometers, is optically transparent, and has a refractive index of at least 1.42. The coatable composition comprises a polyoxometalate, and at least one siloxane-based polyamine. In some embodiments the coatable composition further comprises a solvent, a fluid or a combination thereof.

BRIEF DESCRIPTION OF THE DRAWINGS

The present application may be more completely understood in consideration of the following detailed description of various embodiments of the disclosure in connection with the accompanying drawings.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The increased complexity of optical devices places increasingly difficult-to-meet requirements upon the materials used in them. In particular, organic polymeric materials have found widespread use in optical devices, but increasingly stringent requirements are being placed upon these polymeric materials.

For example, thin organic polymeric films are desirable for a wide range of uses in optical devices, as adhesives, protective layers, spacer layers, and the like. As articles have become more complex, the physical demands upon these layers have increased. For example, as optical devices have become more compact, and at the same time often include more layers, there has been an increasing need for thinner layers. At the same time, since the layers are thinner, the layers also need to be more precise. For example, a thin spacer layer (of 1 micrometer thickness) in order to be effective as a spacer needs to be level and free of gaps and holes in order to provide the proper spacing function. This requires deposition of the organic layer in a precise and consistent manner.

Additionally, not only do these layers have to supply their physical role (adhesion, protection, spacing, and the like) they must also provide the requisite optical properties. Among the properties that are becoming increasingly important is refractive index. As light travels through the layers of a multilayer article, it encounters the interface between layers. If the refractive indices of the layers are different, light can be refracted. Therefore, to minimize this refraction, matching of the refractive indices of layers within a multilayer article is desirable.

Since many layers within optical devices have refractive indices that are higher than typical organic polymer layers, much effort has been expended to develop organic polymer layers with higher refractive indices. However, often these organic polymer layers have drawbacks.

A number of techniques for preparing polymeric layers with a high refractive index using organic polymeric layers have been described. Typically, the methods have involved using high refractive index monomers, using high refractive index additives, or a combination of these methods. Each of the methods has advantages and drawbacks. Generally, high refractive index monomers suitable for making high refractive index polymers, such as aromatic monomers, are frequently expensive and often have a high viscosity making it difficult to prepare coatable compositions with these monomers. Additionally, the use of high refractive index additives such as metal oxide nanoparticles, can increase the viscosity making it difficult to prepare coatable compositions, and also can reduce the flexibility and increase the brittleness of the layer making it less suitable as a thin optical layer.

Another issue with high refractive index organic polymeric layers is that the production of the optical devices can involve high energy processing steps such as plasma etching processes. Organic polymeric layers are susceptible to damage by plasma etching processing. Therefore, organic polymeric layers have a number of drawbacks, and the need for polymeric layers without these drawbacks remains.

Among the techniques used to produce polymeric layers with a high refractive index include organometallic polymeric materials such as those described in US Patent Publication No. 2015/0349295 (Boesch et al.). Boesch describes devices that utilize dyads as barrier coatings where the dyads include a first layer (decoupling layer) that is an organic-inorganic hybrid material and the second layer is an inorganic barrier layer. The organic-inorganic hybrid decoupling layer includes an organic matrix with either an organometallic polymer or inorganic nanoparticles such that the inorganic material raises the refractive index to better match the inorganic barrier layer refractive index.

The organometallic polymers used in the layers described by Boesch include metal atoms that are bonded to or reacted into an organic polymer to form an organometallic polymer. Some of these polymers are prepared from monomers, such as (meth)acrylate monomers, that have metal atoms bonded to them. The exemplary embodiment of Boesch uses a monomer blend that includes an acrylate monomer chemically bonded to Zr atoms. The monomer mixture was spin coated, heated and UV-cured.

The generally high viscosity of the curable compositions of Boesch, and the fact that the coatings need to be both heated and cured after coating, can be disadvantageous in the formation of many layered articles, especially those in which thermally- or UV-degradable substrates are to be used. Also, heating and curing can cause changes in the thickness of the coated layer, thereby making these coatings unsuitable where precise thicknesses are required. Additionally, the application of heat and radiation can adversely affect the optical properties of the layer. Therefore, it would be desirable to have a coatable composition that could form a thin polymeric layer without the need for heating or curing.

In this disclosure, coatable compositions are described that self-assemble into crosslinked networks without the need to cure the composition by the application of heat or radiation. In some embodiments, the coatable compositions comprise a polyoxometalate and a siloxane-based polyamine that form crosslinks via an acid-base interaction upon coating to form a layer. In some embodiments, the layers are gels, further comprising a fluid. The layers are optically transparent and have a refractive index of at least 1.42. Also disclosed herein are articles that include layers prepared from the coatable compositions, and methods of preparing such articles. Also disclosed are coatable compositions that comprise a polyoxometalate and siloxane-based monoamine.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an" and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "adjacent" refers to two layers that are proximate to another layer. Layers that are adjacent may be in direct contact with each other, or there may be an intervening layer. There is no empty space between layers that are adjacent.

The term "coatable" as used herein refers to compositions that can be coated onto a surface. Coating can be carried out by a wide array of techniques well known in the art.

The term "gel" as used herein, refers to a composition that includes a crosslinked polymer matrix and a liquid or fluid.

The terms "room temperature" and "ambient temperature" are used interchangeably and have their conventional meaning, that is to say refer to temperature of 20-25° C.

The term "organic" as used herein to refer to a cured layer, means that the layer is prepared from organic materials and is free of inorganic materials.

The term "siloxane or siloxane-based" as used herein refers to polymers that contain units with dialkyl or diaryl siloxane ($-SiR_2O-$) repeating units. The siloxane-based polymers may be segmented copolymers or polysiloxane polymers. The terms silicone and siloxane are used interchangeably.

The term "hydrocarbon group" as used herein refers to any monovalent group that contains primarily or exclusively carbon and hydrogen atoms. Alkyl and aryl groups are examples of hydrocarbon groups.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof.

Some heteroalkylenes are polyoxyalkylenes where the heteroatom is oxygen such as for example, —CH$_2$CH$_2$(OCH$_2$CH$_2$)$_n$OCH$_2$CH$_2$—.

The term "heteroaromatic" or "heteroaryl" are used interchangeably and as used herein refers to an aromatic ring that contains at least one heteroatom in the ring structure.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

Unless otherwise indicated, "optically transparent" refers to a layer, film, or article that has a high light transmittance over at least a portion of the visible light spectrum (about 400 to about 700 nm). Typically, optically transparent layers, films, or articles have a luminous transmission of at least 90%.

Unless otherwise indicated, "optically clear" refers to a layer, film, or article that has a high light transmittance over at least a portion of the visible light spectrum (about 400 to about 700 nm), and that exhibits low haze. Typically, optically clear layers, films, or articles have visible light transmittance values of at least 90%, often at least 95%, and haze values of 5% or less, often 2% or less.

Disclosed herein are coatable metal-hybrid compositions that upon coating spontaneously self-assemble to form a crosslinked matrix. In some embodiments, the metal-polymer hybrid composition comprises a polyoxometalate and a siloxane-based polyamine. The coatable composition, upon coating, forms a layer where the polyoxometalate and the amino groups of the siloxane-based polyamine form crosslinks via an acid-base interaction. The layer is optically transparent and has a refractive index of at least 1.42.

The polyoxometalate is an acid-functional compound, and the siloxane-based polyamine is obviously a basic-functional compound. When these two components are mixed they form an acid-base interaction, which for the purposes of this disclosure comprises crosslinking. The acid-base interaction that is present between the polymeric components may be described as a Bronsted acid-base type interaction. Bronsted acid-base interactions involve the transfer of a proton, (H$^+$) ion. In Bronsted acid-base interactions, the acidic component contains an ionizable terminal hydrogen atom that is transferable, and the base component contains an electron pair capable of accepting the proton ion. The Bronsted acid-base reaction forms an interaction that is ionic in nature and is often described as an ionic bond.

A wide range of polyoxometalates are suitable for preparing the coatable compositions of this disclosure. Polyoxometalate (abbreviated POM) is a polyatomic ion, usually an anion, that consists of three or more transition metal oxyanions linked together by shared oxygen atoms to form closed 3-dimensional frameworks. Two broad families are recognized, isopolymetalates, composed of only one kind of metal and oxide, and heteropolymetalates, composed of one metal, oxide, and a main group oxyanion (phosphate, silicate, etc.).

Typically, the polyoxometalates of this disclosure comprise a polyoxometalate of tungsten, molybdenum, vanadium, tantalum or niobium. One particularly suitable polyoxometalate comprises a tungstosilic acid.

The coatable composition also comprises a siloxane-based polyamine. In many embodiments, the siloxane-based polyamine comprises at least 2 amino groups, wherein the amino groups are pendant, terminal or a combination thereof.

A wide range of siloxane-based polyamines are suitable. Many amino-terminated polydimethylsiloxane materials are commercially available. In some embodiments, these materials have the general structure shown in Formula I below:

HR$^1$N-A-Si(CH$_3$)$_2$—O—[—Si(CH$_3$)$_2$—O—]$_n$—Si(CH$_3$)$_2$-A-NHR$^1$   Formula I where R$^1$ is a hydrogen atom or an alkyl or aryl group, A is an alkylene linking group, typically a propylene group, and n is an integer greater than 1. In embodiments where R$^1$ is a hydrogen atom the amine is a primary amine, in embodiments where R$^1$ is an alkyl or aryl group, the amine is a secondary amine. Among the commercially available amino-terminated polydimethylsiloxane materials are the range of aminopropyl-terminated polydimethylsiloxanes from Gelest, Morrisville, PA under the trade names DMS-A11, DMS-A12, DMS-A15, DMS-A21, DMS-A31, DMS-A32, and DMS-A35.

In other embodiments, the siloxane-based polyamine can be described as an (aminopropylmethylsiloxane)-dimethyl siloxane copolymer having the general structure shown in Formula II below:

(CH$_3$)$_3$Si—O—[—Si(CH$_3$)$_2$—O—]$_m$—[—Si(CH$_3$)(CH$_2$CH$_2$CH$_2$—NHR$^1$)—O—]$_p$—Si(CH$_3$)$_3$   Formula II where R$^1$ is a hydrogen atom or an alkyl or aryl group, m is an integer of 1 or greater and p is an integer of 2 or greater.

Among the commercially available (aminopropylmethylsiloxane)-dimethyl siloxane copolymer materials are the range of (aminopropylmethylsiloxane)-dimethyl siloxane copolymers from Gelest, Morrisville, PA under the trade names AMS-132, AMS-152, AMS-191, AMS-1203, AMS-162, and AMS-163.

The coatable compositions of this disclosure comprise at least one polyoxometalate compound and at least one siloxane-based polyamine and may also include a variety of different additional components if desired. One component that may be present is a solvent. Solvents are fluids that serve as a carrying medium for the polyoxometalate and siloxane-based polyamine and are compatible with these components. The solvent does not react with or permanently interact with either component so as to not adversely affect the crosslinking interaction formed by the polyoxometalate and the siloxane-based polyamine. The solvent may interact with the polyoxometalate and/or the siloxane-based polyamine to prevent these components from interacting and forming the physical crosslinks until the solvent is removed. Since the solvent does not become part of the layer formed by the coatable composition, the solvent is removed after the coatable composition is contacted to a surface to form a coating. The solvent may be removed by allowing it to evaporate, or the evaporation may be accelerated by exposure to heat, such as by placing the coating in an oven. Solvents in this disclosure are differentiated from the fluids described below in that solvents are only temporary components of the composition and are removed when the layer is formed, whereas the fluids described below are permanent components of the composition and remain within the layer when the layer is formed.

Examples of suitable solvents include: ethers such as diethyl ether and tetrahydrofuran; esters such as ethyl acetate; ketones such as acetone and MEK (methylethylketone), alcohols such as methanol, ethanol, and isopropanol; halogenated solvents such as $CHCl_3$ or $CH_2Cl_2$; aromatic solvents such as benzene, toluene, or xylene; or mixtures thereof.

In some embodiments, the coatable composition further comprises a fluid. As described above, fluids in this disclosure are differentiated from solvents in that solvents are only temporary components of the composition and are removed when the layer is formed, whereas the fluids described below are permanent components of the composition and remain within the layer when the layer is formed. Layers that comprise a physically crosslinked matrix of the polyoxometalate and the siloxane-based polyamine and a fluid are referred to in this disclosure as gels. Layers of gel compositions are also optically transparent and have a refractive index of at least 1.42.

A wide range of fluids are suitable in the gel compositions of this disclosure. PDMS (polydimethylsiloxane) and polyalkylarylsiloxane fluids are particularly suitable fluids. Examples of suitable PDMS fluids include decamethylcyclopentasiloxane, commercially available from Alfa Aesar, Tewksbury, MA as 42412. Examples of suitable polyalkylarylsiloxane fluids include the polyphenylmethylsiloxane fluid commercially available from Gelest, Morrisville, PA as PMS-H03.

As with the coatable compositions described above, the gel compositions may also include one or more solvents. The solvents can be removed upon coating of the coatable composition to form the gel layer.

In some embodiments, the coatable compositions may be a solution. Solutions are well understood in the art as compositions containing solid components dissolved in a fluid medium. Because the polyoxometalate and the siloxane-based polyamine spontaneously form crosslinks by an acid-base interaction, having these components dissolved and dispersed within a solution can aid in preventing these crosslinks from forming until desired. The coatable composition solutions of this disclosure comprise the polyoxometalate and the siloxane-based polyamine and further comprise at least one solvent. Suitable solvents have been described above. In some embodiments, the coatable composition solution also further comprises a fluid as described above. Particularly suitable fluids are PDMS and polyphenylmethylsiloxane fluids.

Also disclosed herein are metal-polymer hybrid compositions comprising a polyoxometalate and a siloxane-based monoamine. As with the compositions described above, the compositions comprising a polyoxometalate and a siloxane-based monoamine are coatable compositions that upon coating forms a layer wherein the polyoxometalate and the amino groups of the siloxane-based monoamine form an acid-base interaction, and wherein the layer is optically transparent and has a refractive index of at least 1.42. Since the siloxane-based amine is monofunctional, the layer comprising the layer is not a crosslinked composition and in some embodiments may remain a liquid.

As with the compositions described above, a wide range of polyoxometalates are suitable for preparing the coatable compositions. Typically, the polyoxometalates of this disclosure comprise a polyoxometalate of tungsten, molybdenum, vanadium, tantalum or niobium. One particularly suitable polyoxometalate comprises a tungstosilic acid.

The coatable composition also comprises a siloxane-based monoamine. A wide range of siloxane-based monoamines are suitable. Many mono-amino-functional polydimethylsiloxane materials are commercially available. In some embodiments, these materials have the general structure shown in Formula III below:

$R^1HN-A-Si(CH_3)_2-O-[-Si(CH_3)_2-O-]_q-Si(CH_3)_2-R^2$  Formula III where A is an alkylene linking group, typically a propylene group; q is an integer greater than 1; and $R^1$ is hydrogen or an alkyl or aryl group; and $R^2$ is an alkyl group with 1-10 carbon atoms. In embodiments where $R^1$ is a hydrogen atom the amine is a primary amine, in embodiments where $R^1$ is an alkyl or aryl group, the amine is a secondary amine.

Among the commercially available mono-amino-functional polydimethylsiloxane materials is the asymmetric aminopropyl-terminated polydimethylsiloxane described by Formula III where A is a propylene group and $R^1$ is a butyl group, from Gelest, Morrisville, PA under the trade names MCR-A11.

As in the coatable compositions described above, the polyoxometalate and siloxane-based monoamine coatable compositions may further comprise a solvent. Suitable solvents are discussed above. In some embodiments, the polyoxometalate and siloxane-based monoamine coatable compositions are solutions, where the coatable compositions further comprise at least one solvent.

In some embodiments, the coatable compositions further comprise a siloxane-based polyamine. Siloxane-based polyamines have been described in detail above.

Also disclosed are articles. In some embodiments, the article comprises a substrate with a first major surface and a second major surface, a metal-polymer hybrid layer adjacent to at least a portion of the second major surface of the substrate. The metal-polymer hybrid layer comprises a layer prepared from a coatable composition, where the coatable composition comprises a polyoxometalate, and at least one siloxane-based polyamine. Siloxane-based polyamines are described in detail above. The layer and has a thickness of from 50 nanometers-16 micrometers, is optically transparent, and has a refractive index of at least 1.42. In some embodiments, the article further comprises an inorganic barrier layer in contact with the metal-polymer hybrid layer.

A wide array of flexible and non-flexible substrates is suitable. For example, the substrate may be glass or a relatively thick layer of a polymeric material such as PMMA (polymethyl methacrylate) or PC (polycarbonate). Alternatively, the substrate may be a flexible polymeric film such as films of PET (polyethylene terephthalate), PEN (polyethylene naphthalate), PC (polycarbonate), polyimide, PEEK (polyetherether ketone), and the like.

The inorganic barrier layer in contact with the metal-polymer hybrid layer can be prepared from a variety of materials including metals, metal oxides, metal nitrides, metal oxynitrides, metal carbides, metal oxyborides, and combinations thereof. A wide range of metals are suitable for use in the metal oxides, metal nitrides, and metal oxynitrides, particularly suitable metals include Al, Zr, Si, Zn, Sn, and Ti.

While the refractive index of the inorganic barrier layer is not particularly limited, generally it is greater than 1.60, and in many embodiments the refractive index of the inorganic barrier layer is 1.70 or greater. One particularly suitable inorganic barrier layer material is silicon nitride.

The inorganic barrier layer can be deposited on the metal-polymer hybrid layer in a variety of ways. In general, any suitable deposition method can be utilized. Examples of suitable methods include vacuum processes such as sputtering, chemical vapor deposition, metal-organic chemical vapor deposition, plasma enhanced chemical vapor deposition, evaporation, sublimation, electron cyclotron resonance-plasma enhanced chemical vapor deposition, and combinations thereof.

In many embodiments, the substrate has an inorganic layer disposed on the second major surface. In these embodiments, the metal-polymer hybrid layer is in contact with the inorganic layer instead of being in direct contact with the substrate itself. The inorganic layer is similar to inorganic barrier layer described above, and may in fact be a barrier layer. The composition and properties of the inorganic layer are the same as for inorganic barrier layer. The inorganic layer on the substrate and the inorganic barrier layer may comprise the same material composition or they may be different.

Coatable compositions suitable for forming the articles of this disclosure are described in detail above. The coatable compositions comprise a polyoxometalate and siloxane-based polyamine. The coatable compositions may further comprise a solvent, a fluid, or a combination thereof. The coatable compositions are disposed upon the substrate surface to form the metal-polymer hybrid layer. In some embodiments, the metal-polymer hybrid layer is a gel layer where the layer further comprises a fluid. Examples of suitable fluids are described above, with PDMS or polyphenylmethylsiloxane fluids being particularly suitable.

In some embodiments, the articles further comprise a device disposed on the second major surface of the substrate, and adjacent to the metal-polymer hybrid layer. A wide array of devices is suitable. In some embodiments, the device comprises an OLED (organic light-emitting diode).

Figure 1:
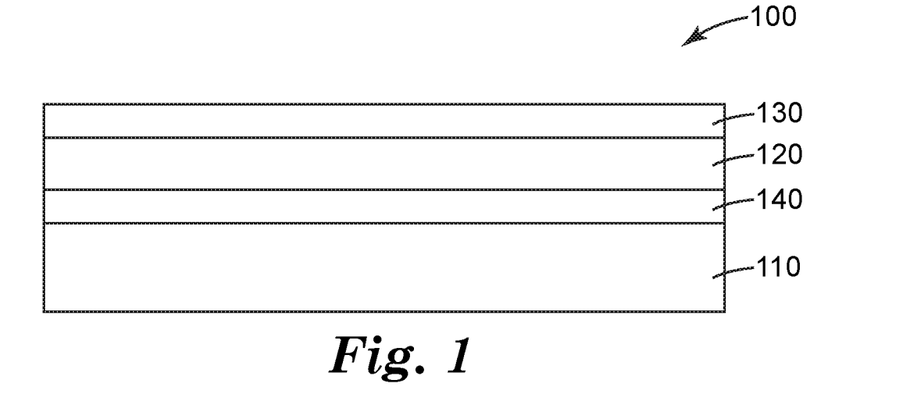
FIG. 1 shows a cross-sectional view of an embodiment of an article of this disclosure.

FIG. 1 shows article 100 that comprises substrate 110 with metal-polymer hybrid layer 120 adjacent to the substrate, and inorganic barrier layer 130 in contact with metal-polymer hybrid layer 120. FIG. 1 also includes optional inorganic layer 140 which is in contact with substrate 110 and in contact with metal-polymer hybrid layer 120. Each of these elements are described above.

Figure 2:
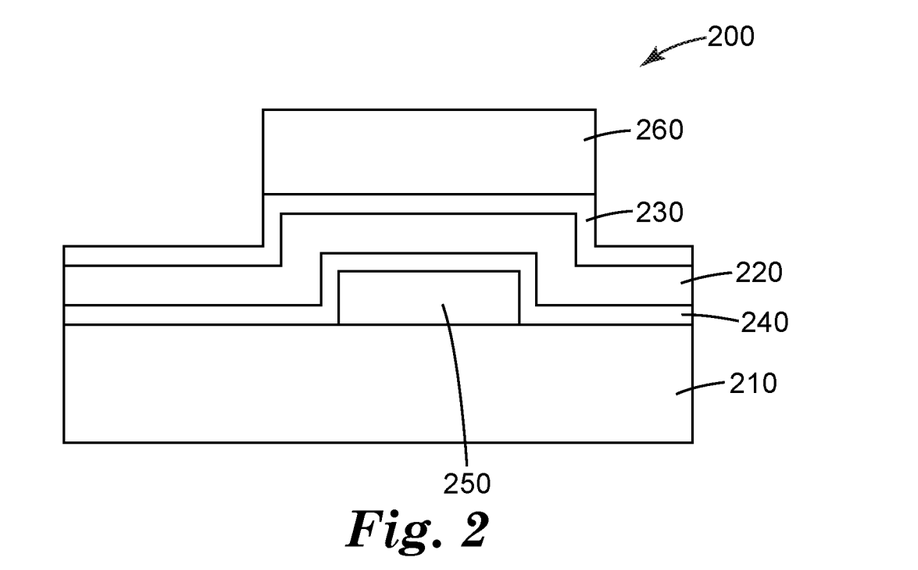
FIG. 2 shows a cross-sectional view of a device of this disclosure.

FIG. 2 shows a device that includes the multilayer article of the present disclosure. FIG. 2 shows device 200 comprising substrate 210 with device 250 disposed on substrate 210. As with FIG. 1 above, metal-polymer hybrid layer 220 is adjacent to the substrate and device 250, and inorganic barrier layer 230 in contact with metal-polymer hybrid layer 220. FIG. 2 also includes optional inorganic layer 240 that is in contact with substrate 210 and device 250 and is in contact with metal-polymer hybrid layer 220. Optional layer 260 may be a single layer or multiple layers and may include both organic and inorganic layers and may include adhesive layers, optical layers, and the like. Layers 210 (substrate), 220 (metal-polymer hybrid layer), 230 (inorganic barrier layer), and 240 (optional inorganic layer) are the same as described above for FIG. 1.

Device 250 may comprise a variety of devices, especially optical devices that for which the use of an inorganic barrier layer is useful. Among the particularly suitable devices are OLED devices. OLED devices are well known in the art.

Also disclosed are methods for preparing articles. In some embodiments, the method comprises providing a substrate with a first major surface and a second major surface, providing a coatable composition, and disposing the coatable composition on at least a portion of the second major surface of the substrate to form a metal-polymer hybrid layer. The coatable composition comprises a polyoxometalate and at least one siloxane-based polyamine. The polyoxometalate and the amino groups of the siloxane-based amine form an acid-base interaction, upon formation of a metal-polymer hybrid layer. The layer has a thickness of from 50 nanometers-16 micrometers, is optically transparent, and has a refractive index of at least 1.42.

The coating compositions have been described in detail above. As described above, the coating composition may further comprise a solvent, a fluid or a combination thereof. In some embodiments, the metal-polymer hybrid layer comprises a gel layer where the layer further comprises a fluid. Examples of suitable fluids are described above, with PDMS or polyphenylmethylsiloxane fluids being particularly suitable.

Generally, if a solvent is used in the coating compositions, the method further comprises a drying step. In some embodiments, drying involves the application of heat, such as with an oven.

The disclosure includes the following embodiments:

Among the embodiments are coatable compositions. Embodiment 1 is a metal-polymer hybrid composition comprising: a polyoxometalate; and a siloxane-based polyamine, wherein the composition is a coatable composition that upon coating forms a layer wherein the polyoxometalate and the amino groups of the siloxane-based polyamine form crosslinks via an acid-base interaction, and wherein the layer is optically transparent and has a refractive index of at least 1.42.

Embodiment 2 is the composition of embodiment 1, wherein the siloxane-based polyamine comprises at least 2 amino groups, wherein the amino groups are pendant, terminal or a combination thereof.

Embodiment 3 is the composition of embodiment 1 or 2, wherein the polyoxometalate comprises a polyoxometalate of tungsten, molybdenum, vanadium, tantalum or niobium.

Embodiment 4 is the composition of embodiment 1 or 2, wherein the polyoxometalate comprises a tungstosilic acid.

Embodiment 5 is the composition of any of embodiments 1-4, wherein the layer comprises a gel composition further comprising a fluid.

Embodiment 6 is the composition of embodiment 5, wherein the fluid comprises a PDMS (polydimethylsiloxane) or a polyphenylmethylsiloxane fluid.

Embodiment 7 is the composition of any of embodiments 1-6, wherein the composition is a solution further comprising at least one solvent.

Embodiment 8 is the composition of embodiment 7, wherein the solution further comprises a fluid.

Embodiment 9 is the composition of embodiment 8, wherein the fluid comprises a PDMS (polydimethylsiloxane) or a polyphenylmethylsiloxane fluid.

Embodiment 10 is a metal-polymer hybrid composition comprising: a polyoxometalate; and a siloxane-based monoamine, wherein the composition is a coatable composition that upon coating forms a layer wherein the polyoxometalate and the amino groups of the siloxane-based monoamine form an acid-base interaction, and wherein the layer is optically transparent and has a refractive index of at least 1.42.

Embodiment 11 is the composition of embodiment 10, wherein the polyoxometalate comprises a polyoxometalate of tungsten, molybdenum, vanadium, tantalum or niobium.

Embodiment 12 is the composition of embodiment 10, wherein the polyoxometalate comprises a tungstosilicic acid.

Embodiment 13 is the composition of any of embodiments 10-12, wherein the composition is a solution further comprising at least one solvent.

Embodiment 14 is the composition of any of embodiments 10-13, wherein the composition further comprises a siloxane-based polyamine.

Also disclosed are articles. Embodiment 15 is an article comprising: a substrate with a first major surface and a second major surface; a metal-polymer hybrid layer adjacent to at least a portion of the second major surface of the substrate, wherein the metal-polymer hybrid layer comprises a layer prepared from a coatable composition, wherein the coatable composition comprises: a polyoxometalate; and at least one siloxane-based polyamine; and wherein the layer and has a thickness of from 50 nanometers-16 micrometers, is optically transparent, and has a refractive index of at least 1.42; and an inorganic barrier layer in contact with the metal-polymer hybrid layer.

Embodiment 16 is the article of embodiment 15, wherein the substrate comprises an inorganic coating layer present on the second major surface, such that the metal-polymer hybrid layer is in contact with the inorganic coating layer.

Embodiment 17 is the article of embodiment 15 or 16, wherein the metal-polymer hybrid layer comprises a gel layer further comprising a fluid.

Embodiment 18 is the article of any of embodiments 15-17, wherein the coatable composition further comprises at least one solvent.

Embodiment 19 is the article of any of embodiments 15-18, wherein the article further comprises a device disposed on the second major surface of the substrate, and adjacent to the metal-polymer hybrid layer.

Embodiment 20 is the article of embodiment 19, wherein the device comprises an OLED (organic light-emitting diode).

Also disclosed are methods of preparing articles. Embodiment 21 is a method of preparing an article comprising: providing a substrate with a first major surface and a second major surface; providing a coatable composition wherein the coatable composition comprises: a polyoxometalate; and at least one siloxane-based polyamine; disposing the coatable composition on at least a portion of the second major surface of the substrate to form a layer; wherein the layer and has a thickness of from 50 nanometers-16 micrometers, the polyoxometalate and the amino groups of the siloxane-based amine form an acid-base interaction, and wherein the layer is optically transparent, and has a refractive index of at least 1.42.

Embodiment 22 is the method of embodiment 21, wherein the metal-polymer hybrid layer comprises a gel layer further comprising a fluid.

Embodiment 23 is the method of embodiment 22, wherein the fluid comprises a PDMS (polydimethyl siloxane) or a polyphenylmethylsiloxane fluid.

Embodiment 24 is the method of any of embodiments 21-23, wherein the coatable composition further comprises at least one solvent.

Embodiment 25 is the method of any of embodiments 21-24, further comprising drying the layer.

Examples

Metal-polymer hybrid compositions were prepared. The refractive index of dried compositions was measured. These examples are merely for illustrative purposes only and are not meant to be limiting on the scope of the appended claims. All parts, percentages, ratios, etc. in the examples and the rest of the specification are by weight, unless noted otherwise. The following abbreviations are used herein: g=gram; ° C.=degrees centigrade; mol=mole; mol %=mole percent; Mw=weight-average molecular weight; wt %=percent by weight; nm=nanometer.

Materials

| Material | Abbreviation | Trade Name | Source (Location) |
| --- | --- | --- | --- |
| 12-Tungstosilicic acid hydrate | M1 | 39651/TAH | Alfa Aesar (Tewksbury, MA) |
| Asymmetric monoaminopropyl terminated polydimethylsiloxane | M2 | MCR-A11 | Gelest (Morrisville, PA) |
| Aminopropyl-terminated polydimethylsiloxane | M3 | DMS-A11 | Gelest (Morrisville, PA) |
| Aminopropyl-terminated polydimethylsiloxane | M4 | DMS-A12 | Gelest (Morrisville, PA) |
| Aminopropyl-terminated polydimethylsiloxane | M5 | DMS-A15 | Gelest (Morrisville, PA) |
| Aminopropyl-terminated polydimethylsiloxane | M6 | DMS-A21 | Gelest (Morrisville, PA) |
| Aminopropyl-terminated polydimethylsiloxane | M7 | DMS-A31 | Gelest (Morrisville, PA) |
| Aminopropylmethylsiloxane-dimethylsiloxane copolymer | M8 | AMS-191 | Gelest (Morrisville, PA) |

| Material | Abbreviation | Trade Name | Source (Location) |
|---|---|---|---|
| Aminopropylmethylsiloxane-dimethylsiloxane copolymer | M9 | AMS-1203 | Gelest (Morrisville, PA) |
| Aminopropylmethylsiloxane-dimethylsiloxane copolymer | M10 | AMS-162 | Gelest (Morrisville, PA) |
| Decamethylcyclopentasiloxane | M11 | 42412 | Alfa Aesar (Tewksbury, MA) |
| Polyphenylmethylsiloxane | M12 | PMS-H03 | Gelest (Morrisville, PA) |
| Tetrahydrofuran | THF | OmniSolv TX0279-6 | Millipore (Billerica, MA) |

Example Preparation Method

Preparation of amine-functionalized polysiloxane Formulations Carrying (M1) 12-tungstosilic acid (TAH) See Formulations in Table 1

12-Tungstosilicic acid hydrate (0.50 g) and tetrahydrofuran$_{[KG1][CH2]}$ (1.00 g) were loaded into a small vial. To this solution was added amine-functionalized polysiloxane (1.00 g). A small stir bar was added, and the solution was stirred magnetically at ambient temperature for 16 hours. During this period the formulation transitioned from a high viscosity liquid to a non-flowing gel at room temperature. A sample was deposited onto the surface of a glass slide and dried on a hotplate at 100° C. for several hours.

Preparation of amine-functionalized polysiloxane Formulations Carrying (M1) 12-tungstosilic acid (TAH) and Additional polysiloxane See Formulations in Table 2

12-Tungstosilicic acid hydrate (0.50 g) and tetrahydrofuran (1.00 g) were loaded into a small vial. To this solution was added amine-functionalized polysiloxane (1.00 g) and an equivalent amount of decamethylcyclopentasiloxane (1.00 g). A small stir bar was added, and the solution was stirred magnetically at ambient temperature for 16 hours. During this period the formulation transitioned from a high viscosity liquid to a non-flowing gel at room temperature. A sample was deposited onto the surface of a glass slide and dried on a hotplate at 100° C. for several hours.

Test Methods/Property Determination

For the amino (NH2)-functionalized polysiloxanes, substitution type, amine content, and molecular mass were obtained from the supplier (Gelest Silanes & Silicones Handbook, Gelest 5000-A, ISBN 978-0-578-12235-9). Note for mono- and di-functional polysiloxanes amino content is quoted as wt %, while for multi-functional polysiloxanes, amino content is quoted as mol %.

For transparent formulations, the refractive index was measured on a Milton Roy Company refractometer (model number: 334610). The sample was sealed between two prisms and the refractive index was monitored until it no longer changed. The refractive index was measured at 23° C. at the 589 nm line of a sodium lamp.

Examples

Two component and three component Example formulations, as described by Table 1 and Table 2, were made.

TABLE 1

Two component formulations with tungsten compound and amine-functionalized polysiloxane

| Example | Component C1 | Parts C1 | C2 | Parts C2 |
|---|---|---|---|---|
| CE1 | M1 | 0 | M2 | 100 |
| E1 | M1 | 33 | M2 | 66 |
| CE2 | M1 | 0 | M3 | 100 |
| E2 | M1 | 33 | M3 | 66 |
| E3 | M1 | 50 | M3 | 50 |
| CE3 | M1 | 0 | M4 | 100 |
| E4 | M1 | 50 | M4 | 50 |
| CE4 | M1 | 0 | M5 | 100 |
| E5 | M1 | 33 | M5 | 66 |
| CE5 | M1 | 33 | M6 | 66 |
| CE6 | M1 | 33 | M7 | 66 |
| CE7 | M1 | 0 | M8 | 100 |
| E6 | M1 | 33 | M8 | 66 |
| E7 | M1 | 50 | M8 | 50 |
| CE8 | M1 | 0 | M9 | 100 |
| E8 | M1 | 33 | M9 | 66 |
| CE9 | M1 | 0 | M10 | 100 |
| E9 | M1 | 40 | M10 | 60 |

TABLE 2

Three component formulations with tungsten compound, amine-functionalized polysiloxane and siloxane fluid

| Example | Component 1 -C1 | Parts C1 | C2 | Parts C2 | C3 | Parts C3 |
|---|---|---|---|---|---|---|
| E10 | M1 | 24 | M8 | 38 | M11 | 38 |
| E11 | M1 | 50 | M8 | 25 | M12 | 25 |
| E12 | M1 | 20 | M9 | 40 | M11 | 40 |
| CE10 | M1 | 0 | M10 | 50 | M11 | 50 |
| E13 | M1 | 20 | M10 | 40 | M11 | 40 |
| E14 | M1 | 26 | M10 | 37 | M12 | 37 |
| E15 | M1 | 20 | M3 | 40 | M12 | 40 |
| E16 | M1 | 26 | M3 | 37 | M12 | 37 |
| E17 | M1 | 50 | M3 | 25 | M12 | 25 |

TABLE 3

Physical Properties of Two Component Formulations

| Formulation | Appearance | Substitution type | Polysiloxane amino ($NH_2$) content | Polysiloxane molecular mass (Mw) | Refractive Index |
|---|---|---|---|---|---|
| CE1 | Transparent liquid | Mono | 1-2 wt % | 800-1000 | 1.411 |
| E1 | Transparent liquid | Mono | 1-2 wt % | 800-1000 | 1.458 |
| CE2 | Transparent liquid | Di | 3-4 wt % | 850-900 | 1.412 |
| E2 | Transparent gel | Di | 3-4 wt % | 850-900 | 1.457 |
| E3 | Transparent gel | Di | 3-4 wt % | 850-900 | 1.486 |
| CE3 | Transparent liquid | Di | 3 wt % | 900-1000 | 1.410 |
| E4 | Transparent gel | Di | 3 wt % | 900-1000 | 1.474 |
| CE4 | Transparent liquid | Di | 1 wt % | 3000 | 1.408 |
| E5 | Transparent gel | Di | 1 wt % | 3000 | 1.446 |
| CE5 | Opaque gel | Di | 0.6-0.7 wt % | 5000 | NA |
| CE6 | Opaque gel | Di | 0.11-0.12 wt % | 25,000 | NA |
| CE7 | Transparent liquid | Multi | 9-11 mol % | 2000-3000 | 1.412 |
| E6 | Transparent gel | Multi | 9-11 mol % | 2000-3000 | 1.456 |
| E7 | Transparent gel | Multi | 9-11 mol % | 2000-3000 | 1.486 |
| CE8 | Transparent liquid | Multi | 20-25 mol % | 20,000 | 1.422 |
| E8 | Opaque gel | Multi | 20-25 mol % | 20,000 | NA |
| CE9 | Transparent liquid | Multi | 6-7 mol % | 4000-5000 | 1.406 |
| E9 | Transparent gel | Multi | 6-7 mol % | 4000-5000 | 1.458 |

TABLE 4

Physical Properties of Three Component Formulations

| Formulation | Appearance | Substitution type | Polysiloxane amino ($NH_2$) content | Polysiloxane molecular mass (Mw) | Refractive Index |
|---|---|---|---|---|---|
| E10 | Transparent gel | Multi | 9-11 mol % | 2000-3000 | 1.420 |
| E11 | Transparent gel | Multi | 9-11 mol % | 2000-3000 | 1.487 |
| E12 | Transparent gel | Multi | 20-25 mol % | 20,000 | 1.421 |
| CE10 | Transparent liquid | Multi | 6-7 mol % | 4000-5000 | 1.402 |
| E13 | Transparent gel | Multi | 6-7 mol % | 4000-5000 | 1.426 |
| E14 | Transparent gel | Multi | 6-7 mol % | 4000-5000 | 1.464 |
| E15 | Transparent gel | Di | 3-4 wt % | 850-900 | 1.468 |
| E16 | Transparent gel | Di | 3-4 wt % | 850-900 | 1.471 |
| E17 | Transparent gel | Di | 3-4 wt % | 850-900 | 1.486 |

Addition of TAH to low mass amine polysiloxanes (Mw<5000) at 33-50 wt % gives transparent materials with increased refractive index (E2, E3, E4, E5), whereas addition of TAH to higher mass amine polysiloxanes (5000 and above) at 33 wt % gives opaque materials (CE5, CE6, E8).

Addition of TAH to monofunctional amine polysiloxane liquids gives a liquid of increased index (E1), since a mono functional polysiloxane cannot form a crosslinked network with the multifunctional TAH.

Addition of TAH to difunctional amine polysiloxane liquids (E2, E3, E4, CE5, CE6), or to multifunctional amino polysiloxane liquids (E6, E7, E8, E9), gives a gel, since di or multifunctional amine polysiloxanes are able to form a crosslinked network with the multifunctional TAH. In cases where the polysiloxane has Mw<5000, the gel is transparent (E2, E3, E4, E5).

Softer swollen versions of the gels above can be prepared by introducing an inert polysiloxane fluid into the formulation (E10 to E17) such as decamethylcyclopentasiloxane ("D5") (E10 to E13) or a higher index fluid such as polyphenylmethylsiloxane (E14 to E17). These gels (E5 to E7) maintain increased refractive indices relative to their polysiloxane components (CE2, CE7, CE8, CE9).

What is claimed is:

1. A metal-polymer hybrid composition comprising:
a polyoxometalate; and
a siloxane-based polyamine, wherein the siloxane-based polyamine is of Formula I or Formula II Formula I wherein $R^1$ is a hydrogen atom or an alkyl or aryl group;
A is an alkylene linking group with 1-3 carbon atoms; and
n is an integer of 1 or greater;

Formula II wherein $R^1$ is a hydrogen atom or an alkyl or aryl group;
m is an integer or 1 or greater; and
p is an integer of 2 or greater;
wherein the composition is a coatable composition that
upon coating forms a layer wherein the polyoxometalate and the amino groups of the siloxane-based polyamine form crosslinks via an acid-base interaction, and wherein
the layer is optically transparent and has a refractive index of at least 1.42, and wherein the layer comprises a gel composition further comprising a fluid wherein the fluid comprises a PDMS (polydimethylsiloxane) fluid or a polyphenylmethylsiloxane fluid.

2. The metal-polymer hybrid composition of claim 1, wherein the polyoxometalate comprises a polyoxometalate of tungsten, molybdenum, vanadium, tantalum or niobium.

3. The metal-polymer hybrid composition of claim 1, wherein the polyoxometalate comprises a tungstosilic acid.

4. The metal-polymer hybrid composition of claim 1, wherein the composition is a solution further comprising at least one solvent.

5. A metal-polymer hybrid composition comprising:
a polyoxometalate; and
a siloxane-based monoamine, wherein the siloxane-based monoamine is of Formula III Formula III wherein $R^1$ is a hydrogen atom or an alkyl or aryl group;
$R^{12}$ is an alkyl group with 1-10 carbon atoms;
A is an alkylene linking group with 1-3 carbon atoms; and
q is an integer of 1 or greater;
wherein the composition is a coatable composition that
upon coating forms a layer wherein the polyoxometalate and the amino groups of the siloxane-based monoamine form an acid-base interaction, and wherein the layer is optically transparent and has a refractive index of at least 1.42, and wherein the
layer comprises a gel composition further comprising a fluid wherein the fluid comprises a PDMS (polydimethylsiloxane) fluid or a polyphenylmethylsiloxane fluid.

6. The metal-polymer hybrid composition of claim 5, wherein the polyoxometalate comprises a polyoxometalate of tungsten, molybdenum, vanadium, tantalum or niobium.

7. The metal-polymer hybrid composition of claim 5, wherein the polyoxometalate comprises a tungstosilic acid.

8. The metal-polymer hybrid composition of claim 5, wherein the composition is a solution further comprising at least one solvent.

9. The metal-polymer hybrid composition of claim 5, wherein the composition further comprises a siloxane-based polyamine wherein the siloxane-based polyamine is of Formula I or Formula II Formula I wherein $R^1$ is a hydrogen atom or an alkyl or aryl group;
A is an alkylene linking group with 1-3 carbon atoms; and
n is an integer of 1 or greater;

Formula II wherein $R^1$ is a hydrogen atom or an alkyl or aryl group;
m is an integer or 1 or greater; and
p is an integer of 2 or greater.

10. An article comprising:
a substrate with a first major surface and a second major surface;
a metal-polymer hybrid layer adjacent to at least a portion of the second major surface of the substrate, wherein the metal-polymer hybrid layer comprises a layer prepared from a coatable composition, wherein the coatable composition comprises:
a polyoxometalate; and
at least one siloxane-based polyamine, wherein the siloxane-based polyamine is of Formula I or Formula II Formula I wherein $R^1$ is a hydrogen atom or an alkyl or aryl group;
A is an alkylene linking group with 1-3 carbon atoms; and
n is an integer of 1 or greater;

Formula II wherein $R^1$ is a hydrogen atom or an alkyl or aryl group;
m is an integer or 1 or greater; and
p is an integer of 2 or greater; and
wherein the layer has a thickness of from 50 nanometers-16 micrometers, is optically transparent, and has a refractive index of at least 1.42; and
an inorganic barrier layer in contact with the metal-polymer hybrid layer, and wherein the layer comprises a gel composition further comprising a fluid wherein the fluid comprises a PDMS (polydimethylsiloxane) fluid or a polyphenylmethylsiloxane fluid.

11. The article of claim 10, wherein the article further comprises a device disposed on the second major surface of the substrate, and adjacent to the metal-polymer hybrid layer.

12. The article of claim 11, wherein the device comprises an OLED (organic light-emitting diode).

13. A method of preparing an article comprising:
providing a substrate with a first major surface and a second major surface;
providing a coatable composition wherein the coatable composition comprises:
a polyoxometalate; and
at least one siloxane-based polyamine, wherein the siloxane-based polyamine is of Formula I or Formula II Formula I wherein $R^1$ is a hydrogen atom or an alkyl or aryl group;
A is an alkylene linking group with 1-3 carbon atoms; and
n is an integer of 1 or greater;

Formula II wherein $R^1$ is a hydrogen atom or an alkyl or aryl group;
m is an integer or 1 or greater; and
p is an integer of 2 or greater;
disposing the coatable composition on at least a portion of the second major surface of the substrate to form a layer; wherein the layer has a thickness of from 50 nanometers-16 micrometers, the polyoxometalate and the amino groups of the siloxane-based polyamine form a polymeric matrix by an acid-base interaction, and
wherein the layer is optically transparent, and has a refractive index of at least 1.42.

14. The article of claim 13, wherein the coatable composition further comprises at least one solvent.

* * * * *

UNITED STATES PATENT AND TRADEMARK OFFICE
CERTIFICATE OF CORRECTION

| | |
|---|---|
| PATENT NO. | : 12,173,182 B2 |
| APPLICATION NO. | : 17/620947 |
| DATED | : December 24, 2024 |
| INVENTOR(S) | : Claire Hartmann-Thompson |

Page 1 of 1

It is certified that error appears in the above-identified patent and that said Letters Patent is hereby corrected as shown below:

In the Claims

<u>Column 17</u>
Line 27, In Claim 1, delete "integer or" and insert -- integer of --, therefor.
Line 55, In Claim 5, delete "$R^{12}$" and insert -- $R^2$ --, therefor.

<u>Column 18</u>
Line 25, In Claim 9, delete "integer or" and insert -- integer of --, therefor.
Line 51, In Claim 10, delete "integer or" and insert -- integer of --, therefor.

<u>Column 19</u>
Line 18, In Claim 13, delete "integer or" and insert -- integer of --, therefor.

Signed and Sealed this
Third Day of February, 2026

John A. Squires
*Director of the United States Patent and Trademark Office*